United States Patent [19]

Saijo et al.

[11] Patent Number: 4,616,925
[45] Date of Patent: Oct. 14, 1986

[54] READER PRINTER

[75] Inventors: Takao Saijo, Tama; Takanori Saito, Kawasaki; Kuniaki Kamimura, Ebina; Masafumi Fujita, Kawasaki, all of Japan

[73] Assignee: Minolta Camera Kabushiki Kaisha, Osaka, Japan

[21] Appl. No.: 683,770

[22] Filed: Dec. 19, 1984

[30] Foreign Application Priority Data

Dec. 28, 1983 [JP] Japan .................................. 58-249961

[51] Int. Cl.$^4$ .................... G03B 13/24; G03B 13/26
[52] U.S. Cl. .................................. 355/44; 355/29; 355/45; 355/13; 355/55
[58] Field of Search ................ 355/44, 45, 29, 13, 355/55

[56] References Cited

U.S. PATENT DOCUMENTS 3,002,434 10/1961 Reuter .................................. 355/45
3,561,858 2/1971 Balbrerer et al. .
3,856,397 12/1974 Suzuki et al. ......................... 355/45
4,217,052 8/1980 Tani et al. ............................ 355/55
4,278,346 7/1981 Toriumi et al. .
4,310,241 1/1982 Inoue .

Primary Examiner—Monroe H. Hayes
Attorney, Agent, or Firm—Wolder, Gross & Yavner

[57] ABSTRACT

The present invention is directed to a reader printer which handles an image of a microfilm held by an aperture card and maintained in such a manner that the microfilm center aligns with the center of card aperture. At the time of printing, the image of the microfilm is projected by scanning from a scanning start position that is same irrespective of film sizes on a photosensitive member, and the image thereon is transferred to a paper sheet which is provided by cutting the web supplied from rolled paper. The supply of the web is controlled by a first timer which starts simultaneously with start of scanning and the cutting of the web is controlled by a second timer which starts simultaneously with expiration of the first timer.

4 Claims, 11 Drawing Figures

READER PRINTER

FIELD OF THE INVENTION

The present invention relates generally to a reader printer where an image of microfilm is projected, at the time of reading, on a screen with the center of the microfilm being aligned with the reader printer optical axis. At the time of printing, the microfilm is returned to a scanning start position, and is then scanned for slit exposure on a photosensitive member. An image thereby developed on the photosensitive member by a toner and transferred to a sheet cut from a rolled paper web.

More particularly, the reader printer of the present invention handles microfilm held by an aperture card and positioned in such a manner that the microfilm center aligns with the center of the card aperture.

DESCRIPTION OF THE PRIOR ART

Recently, for the reader printer of this type, several kinds of lenses in different magnification ratios are prepared and the lens having desired magnification ratio is selected for use as required. Moreover several kinds of copying sizes, namely several sizes of available copying paper are prepared for respective magnification ratios. For example, for the lenses having magnification ratios of 14.5, 10 and 7.5, four, three and one kind, total of eight kinds of copying sizes are prepared.

Conventional reader printers provide independent detectors, which produce paper supply timing to match the enlarged film picture and copying paper cut timing for determining the copying paper size in combinations corresponding to the number of copying sizes. Due to limitations on the space for disposing such detectors available copying sizes have been limited to a maximum of five.

Moreover, a conventional reader printer has been required to set up complicated measures. In other words, a substrate which holds the aperture card must be exchanged in accordance with alteration of cut size of copying paper because standards for copying paper size is different in various countries.

In addition, displacement of copied picture or cut size error resulting from intrinsic characteristic of copying machines has been compensated by the processing such as positional compensation of detectors, by intuition from the picture of copying paper and cut length obtained and accordingly such compensation has been troublesome and difficult.

OBJECT OF THE INVENTION

It is therefore an object of the present invention to provide a reader printer which is capable of eliminating the disadvantages prior art mentioned above, easily copying with alteration or diversification of cut sizes and magnification ratios merely with a software, removing detectors and outstandingly reducing a number of parts, and realizing easy compensation.

The aforementioned object can be attained by a reader printer having the constitution explained below.

A reader printer for handling an image of microfilm held by an aperture card and positioned in such a manner that the microfilm center aligns with the center of card aperture, comprising;

means for projecting the image of microfilm onto a screen at the time of reading or onto a photosensitive member at the time of printing, means, at the time of printing, for scanning the aperture card across a projection axis for slit manner projection from the scanning start position same for each aperture cards irrespective of film sizes, means for supplying paper web from rolled paper, means for cutting the web supplied in a paper transporting path so as to provide a sheet paper of desired size, means for altering a magnification ratio for projecting the image of microfilm, means for selecting a paper cutting size to be cut by the web cutting means, first timer means which has a timer value in accordance with an altered magnification ratio and a selected cutting size and starts counting of the time simultaneously with the start of scanning of the microfilm, second timer means which has a timer value in accordance with a selected cutting size and starts counting of the time simultaneously with the end of counting of said first timer, and control means which controls said web supplying means and said web cutting means so that the supply of the web starts when the first timer means completes the counting of the time and the web is cut when the second timer means completes the counting of the time.

DESCRIPTION OF THE EMBODIMENT

Figure 1:
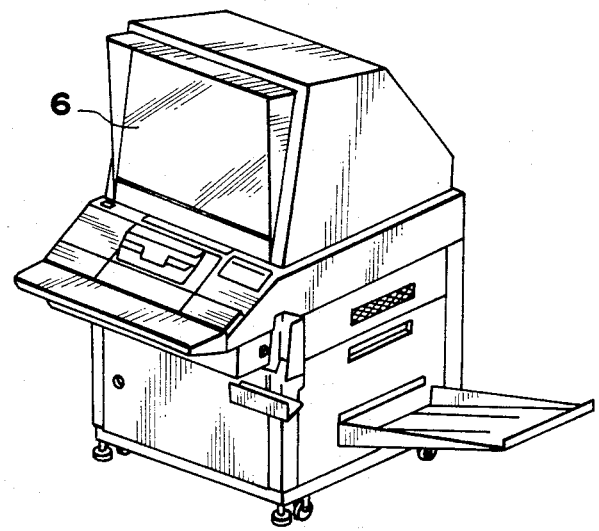
FIG. 1 and FIG. 2 show respectively a perspective view and cross-sectional view of an embodiment of the present invention.
Figure 3:
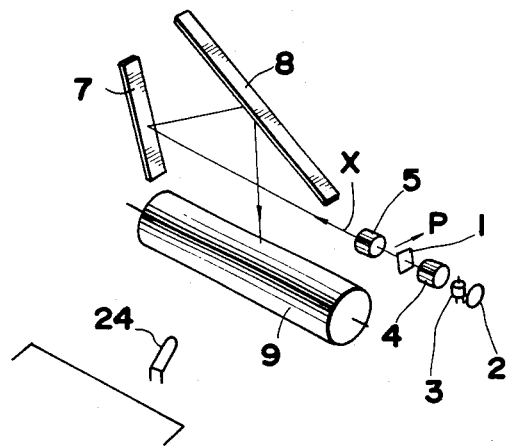
FIG. 3 shows outline of optical system of such embodiment.
Figure 2:
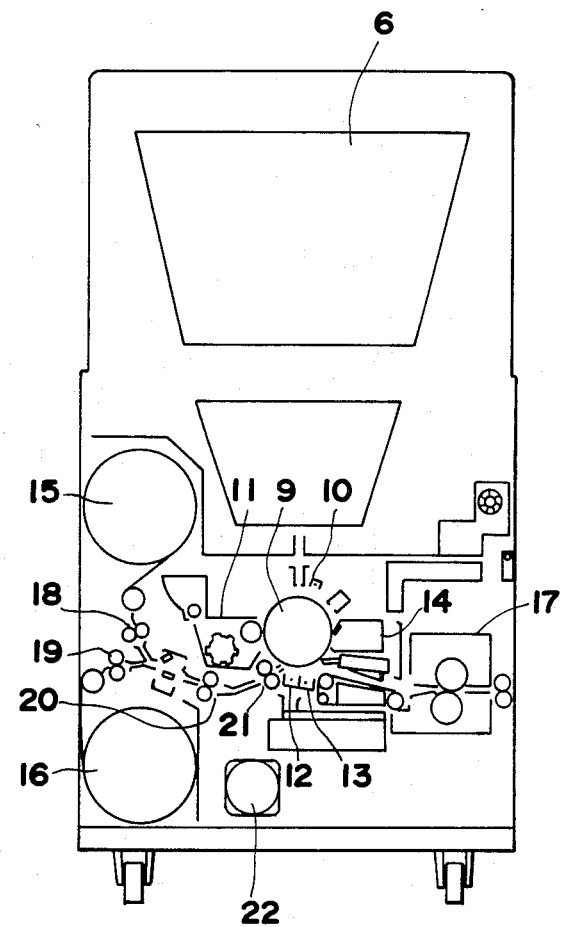

FIG. 1 and FIG. 2 show a perspective view and cross-sectional view of the reader printer for aperture card of this embodiment. FIG. 3 shows outline of constitution of the optical system of such embodiment.

In FIG. 3, 1 is a microfilm which is held by an aperture card and is maintained in such a manner that the center of picture of film 1 aligns with the center of card aperture. At the time of reading, the center of film 1 is set to the optical axis X of the projecting optical system consisting of a reflector 2, a lamp 3, a condenser lens 4 and a projection lens 5 and thereby a film picture is projected on the screen 6 shown in FIG. 1 and FIG. 2 through the another optical system for reader.

Meanwhile, at the time of printing, film 1 is once returned to the scanning start portion, it is then scanned in the direction indicated by the arrow mark P in FIG. 3, and a projected picture enlarged through the optical system for printer consisting of the reflectors 7 and 8 is slit-exposed on a photosensitive drum member 9. As the projection lenses 5, those having three kinds of magnification ratios of 14.5, 10 and 7.5 are prepared and thereby the lens of the desired magnification ratio can be selected by the button operation at the operation panel.

A printer is formed as the well known powder image transfer type electrophotographic copying system, and a corona charger 10, a developer 11, a transfer charger 12, a separation charger 13 and a cleaning device 14 are sequentially disposed in the drum rotating direction around the photosensitive drum 9. 15 and 16 are rolled paper webs having different width and any one paper web is selected and is sent to the transfer position B of said photosensitive drum 9 from the paper supply path. Here, it is also possible to load two rolled paper webs in the same width. 17 is a fixing device. The copying paper having completed transfer of image is subjected here to the fixing process and then sent to the outside of machine.

A paper supply driving system consisting of roller pairs 18, 19, 20, 21 is driven together with the photosensitive drum 9 by a main motor 22 consisting of a synchronous motor.

Figure 4:
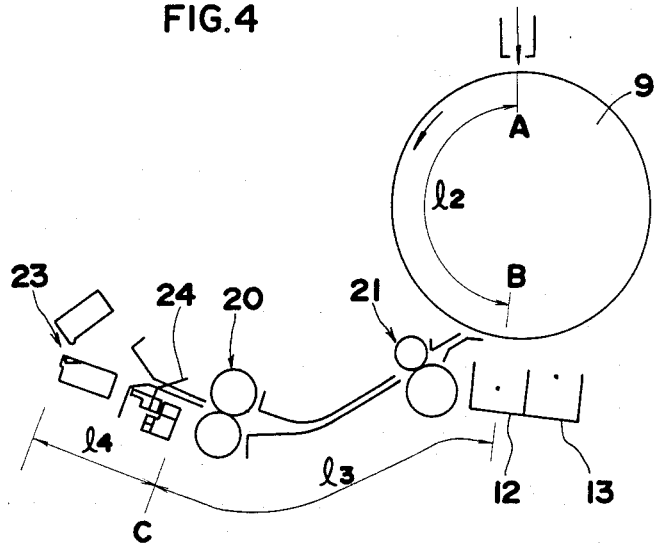
FIG. 4 is a partially enlarged cross-sectional view.

In FIG. 2 and FIG. 4, 23 is a cutter disposed in the course of the paper supply path and the rolled paper web 15 or 16 is cut in to the copying paper sheet having the specified size. A paper supply sensor 24 is provided in front of the cutter 23. This paper supply sensor 24 detects the leading edge of rolled paper web, causing the paper supply clutch of paper supply driving system to turn off and the rolled paper web to temporarily stop at this position C.

Figure 5:
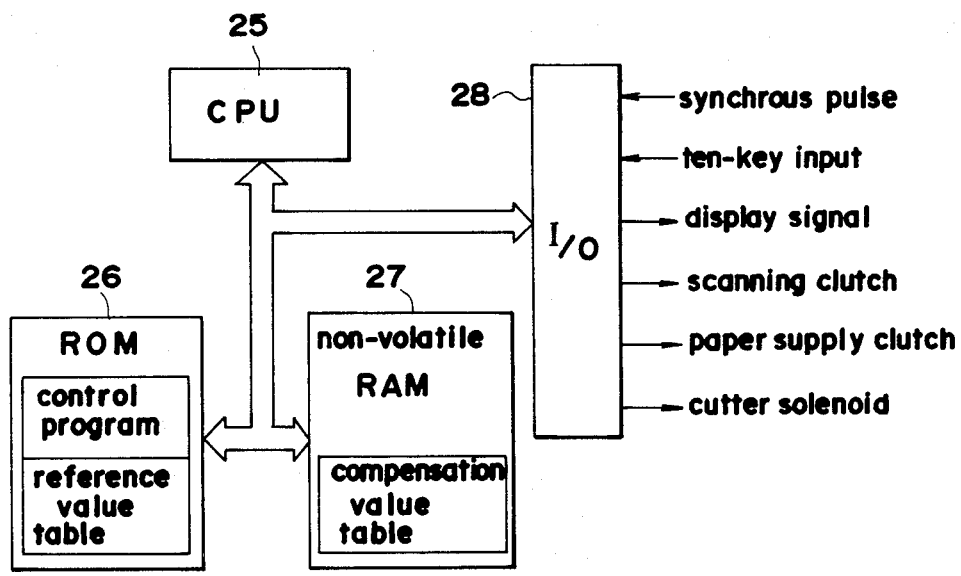
FIG. 5 is a block diagram of control part.

FIG. 5 shows the control part consisting of a microcomputer comprising CPU 25, ROM 26, nonvolatile RAM 27 and I/O port 28, etc.

The ROM 26 of this control part stores a program for controlling the driving system of this reader printer and such driving system is operated in the following procedures.

(1) When the print instruction is issued by the button operation at the operation panel, the optical path is changed to the optical system for printer from the optical system for reader in the optical system shown in FIG. 3 and thereafter the paper supply clutch turns ON, allowing start of paper supply.

(2) When the leading edge of rolled paper web having passed the cutter 23 is detected by the paper supply sensor 24, the paper supply clutch turns OFF and the rolled paper web stops temporarily.

(3) Meanwhile, in the scan driving system, when a detection signal of paper supply sensor 24 is received, the film 1 is moved to the predetermined scanning start position.

(4) After the specified time where vibration of scan driving system moved to the start position came to halt, the scanning clutch turns ON, scanning of film picture starts, and the slit-exposure is carried out sequentially around the photosensitive drum 9 from the exposing position A shown in FIG. 4.

(5) At the sepcified time $T_s$ from start of scanning the paper supply clutch turns ON so that the exposed image around the drum is matched with a copying paper sent from the paper supply path at the transfer position B of photosensitive drum 9 shown in FIG. 4, the rolled paper web is supplied again from the temporary stop position C.

(6) At the specified time $T_c$, where the length up to the leading edge of the rolled paper web from the cutter 23 becomes equal to the length corresponding to the enlarged picture to be exposed to said photosensitive drum 9, the cutter solenoid turns ON and the rolled paper web is cut into the copying paper of the specified size.

(7) When the trailing edge of this copying paper is detected by said paper supply sensor 24, the scanning clutch turns OFF and exposure is completed.

(8) Thereafter, transfer to said copying paper is conducted in the specified sequence and copying operation is completed.

In this reader printer, said setting time $T_s$ for matching between a film picture and copying paper and setting time $T_c$ for paper cutting are set as explained below.

Figure 6A:
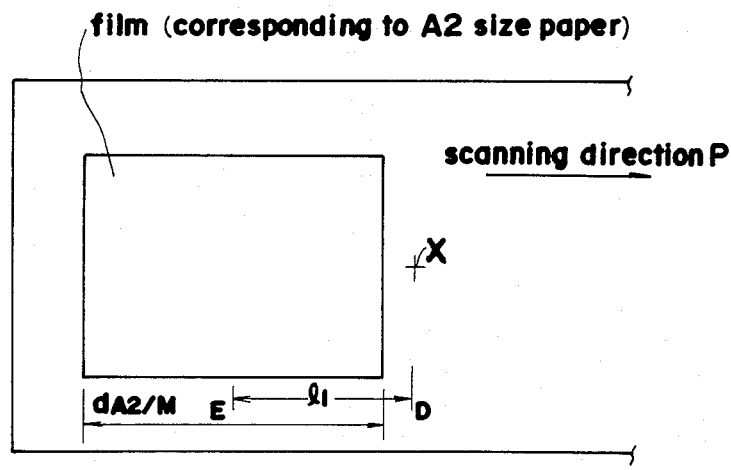
FIG. 6(a), (b), (c) show respectively the positional relations between the scanning start position and the aperture card which hold the microfilms of different sizes.
Figure 6B:
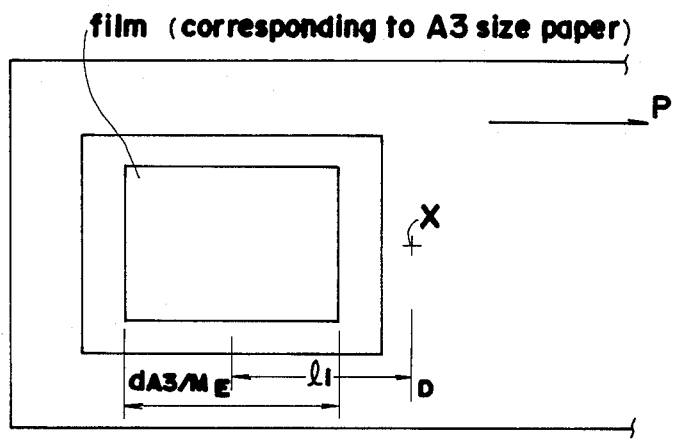
Figure 6C:
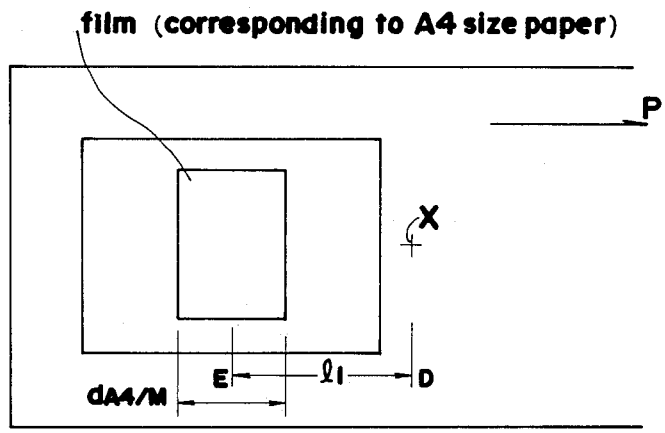

1. Setting time $T_s$ for center matching: Considered in FIG. 4 and FIG. 6 are;

$l_1$: distance on the film 1 up to the center position E of film picture region from the scanning start position D $l_2$: length of circumference up to the transfer position B from the exposing position A on the photosensitive drum 9

M: magnification ratio of a projection lens 5

$l_3$: distance up to the transfer position B from the temporary stop position of paper supply path $l_4$ distance up to the temporary stop position C from cutter 23

$d_n$: Length in the feeding direction of copying paper of selected paper size.

Meanwhile, FIG. 6 shows the relation between the microfilm 1 held by the aperture card AP and the optical axis X. In FIG. 6, the aperture card AP is positioned at the scanning start position, the position which is same for each aperture cards holding the films corresponding to the paper sizes A2, A3 and A4 respectively.

In this case, circumferential length of rotating photosensitive drum 9 until the center of enlarged picture exposed on the photosensitive drum 9 reaches the transfer position B after the start of scanning can be expressed as follow.

$$l_1 \times M + l_2$$

Meanwhile, amount of rolled paper fed until the center of copying paper reaches the transfer position B from the condition that the leading edge thereof is arranged at the temporary stop position C can be expressed as follow.

$$l_3 + d_n/2$$

Accordingly, a difference between the circumferential length of rotating drum until the center of enlarged picture on the photosensitive drum 9 reaches the transfer position B and amount of paper fed until the center of copying paper reaches the transfer position B becomes as follow.

$$l_1 \times M + l_2 - l_3 - d_n/2$$

A value obtained by dividing such difference with a circumferential speed of photosensitive drum 9 or the feed rate of copying paper corresponds to said setting time $T_s$ for matching.

In this embodiment, therefore, a synchronous pulse obtained from the frequency of power source voltage is sent to the said control part and such pulse is used for setting of said time $T_s$ as the speed unit of driving system. In other words, when an amount of feed per said pulse (circumferential length of rotating photosensitive drum 9) is considered as w, the setting time $T_s$ for center matching can converted as follow in terms of a number of pulses.

$$n_s = (1/w) \times (l_1 \times M + l_2 - l_3 - d_n/2)$$

Since a number of this pulses $n_s$ does not become integer, it is replaced with the integer $N_s$ which is nearest to such value. With this value used as the set count value corresponding to said setting time $T_s$, this synchronous pulse is counted simultaneously with start of scanning.

2. Setting time $T_c$ for paper cutting to the specified size:

When an amount of feed of rolled paper from the temporary stop position is indicated as follow;

$$d_n - l_4$$

the length between the leading edge of rolled paper web and the cutter 23 becomes equal to the cutting size $d_n$, the setting time $T_c$ for cutting the paper web in such a size can be expressed as follow in terms of said number of pulses.

$$n_c = (1/w) \times (d_n - l_4)$$

In this case, a number of pulses $n_c$ is replaced with an integer $N_c$ which is nearest to such value. With such value used as the set count value corresponding to said setting time $T_c$, such synchronous pulse is counted simultaneously with restart of paper supply.

Said synchronous pulses are generated as 100 pulse/sec in the power supply frequency of 50 Hz and 120 pulses/sec in the frequency of 60 Hz. These pulses are converted as follow in terms of the amount of feed when the feed rate is considered as 70 mm/sec.

50 Hz : 0.70 mm/pulse
60 Hz : 0.58 mm/pulse

In this example, the timing control is carried out in unit of such value and therefore it becomes the maximum error due to the pulse counting start time and a unit for compensation described later.

As described above, since a number of pulses $N_s$ for center matching is determined by the following factors
(a) magnification ratios of lens (three kinds in this example)
(b) cutting sizes (four kinds)
(c) power supply frequency (two kinds),
many kinds of reference pulses $N_s$ are prepared in order to meet all of such cases.

Similarly, a number of pulses $N_c$ which gives the timing for cutting size is determined by the following factors,
(a) cutting sizes (four kinds in this example)
(b) power supply frequencies (two kinds).

Therefore, several kinds of reference pulses $N_c$ corresponding them are prepared, and the tables of these pulses $N_s$, $N_c$ are prepared for each of above factors in the ROM 26 of said control part.

Here, said factors for determining a number of pulses $N_s$ for center matching further includes the factors some of which gives dispersion on the accuracy.
(a) Deviation is generated in $l_1$ in each machine and lens by displacement of optical axis.
(b) A value of $l_2$ can be said almost constant, although it is a little different in accordance with machines.
(c) Difference is generated in the operation position of paper supply path $l_3$ in accordance with machine and fitting error of paper supply sensor 24.
(d) Magnification ratio M has error in accordance with lens.
(e) A value of w is almost constant, although it is somewhat different in accordance with diameter of roller.

Therefore, a considerable amount of adjustment is required in total.

Similarly, since it is supposed that the temporary stop position C is different for each machine, adjustment of a number of pulses $N_c$ for cutting size is also necessary. The table of compensating values for compensating for difference in accordance with machine for said number of pulses $N_s$ and $N_c$ is prepared in the non-volatile RAM 27 of said control part. Such compensating values are set to said non-volatile RAM 27 by execution of the function mode shown in FIG. 8. In this figure, three kinds of magnification ratios of lenses of 14.5, 10, 7.5 are indicated. The compensating values are input, for example, by a service man using the ten-key provided for setting a number of sheets of copying papers.

Figure 9:
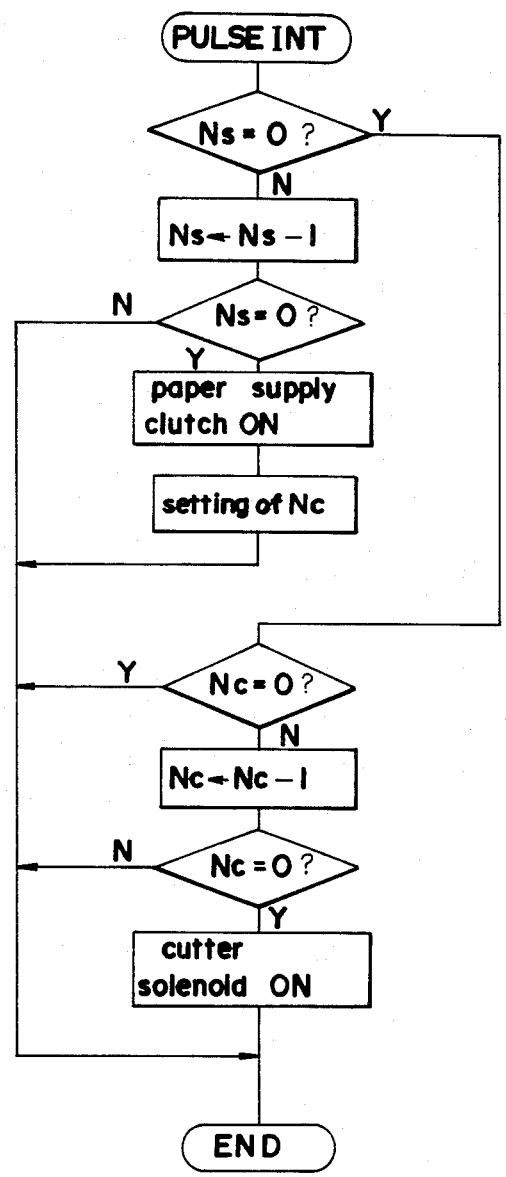

Counting of synchronous pulses used for said center matching and determining cutting size is realized by the interrupt processing. FIG. 9 shows a flow chart of such interrupt routine.

Figure 7:
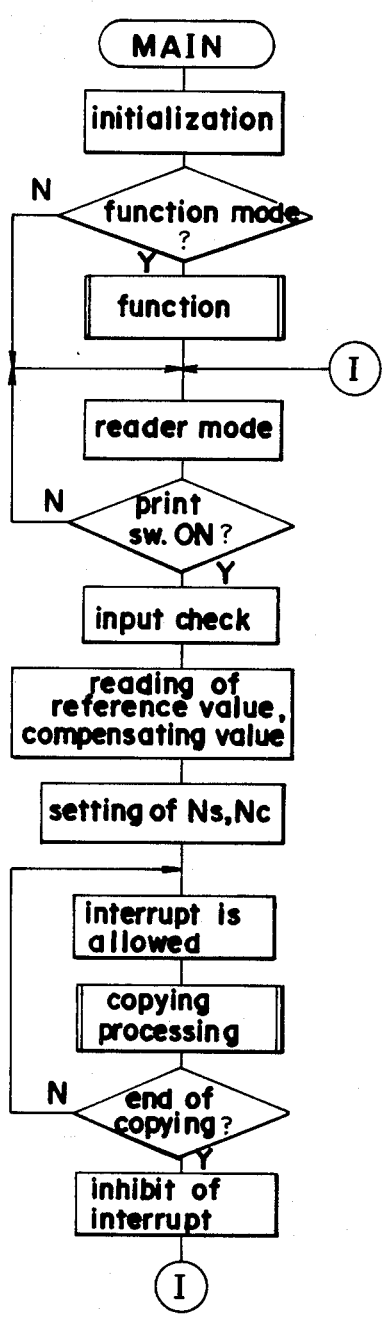
FIG. 7, FIG. 8 and FIG. 9 respectively are flow diagrams indicating the main routine, function mode subroutine and pulse interrupt routine of the control program.

FIG. 7 shows a flow chart of the main routine executed by the control part shown in FIG. 5. Operations of the reader printer of this embodiment are explained on the basis of FIG. 8 and FIG. 9.

(1) Initialization is carried out, upon turning ON of the power supply. Thereby, for example, numbers of pulses $N_s$, $N_c$ used for interrupt routine shown in FIG. 9 are set to zero. This routine is therefore not used from the beginning.

Figure 8:
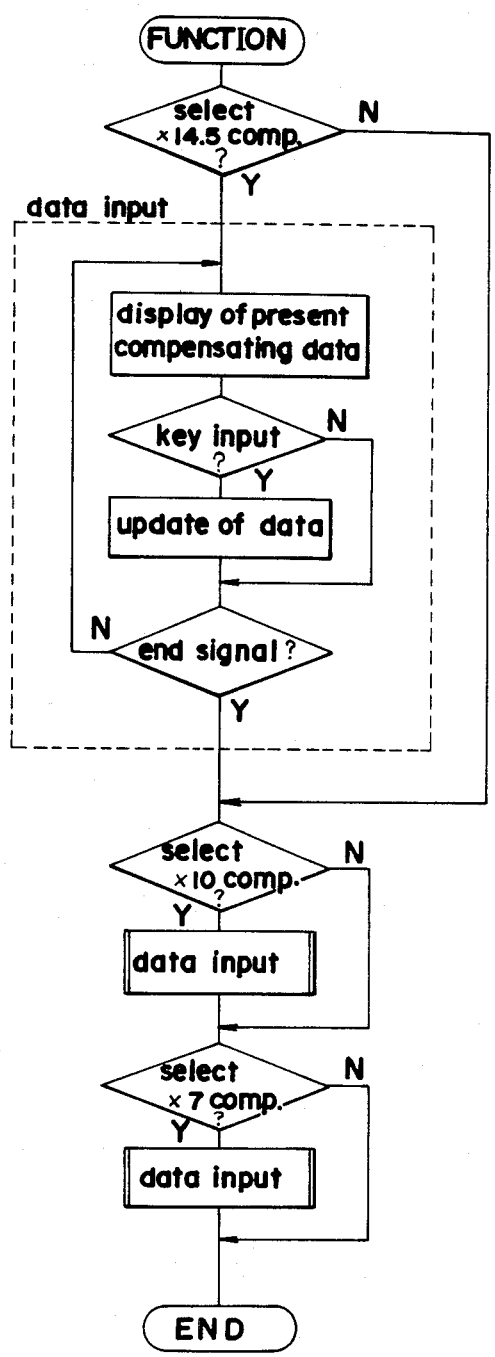

(2) In case execution of function mode is selected, an executable routine moves to the routine shown in FIG. 8. Here, in case compensation for number of pulses $N_s$ or $N_c$ of the lens having mafnification ratio of 14.5 is selected, the subroutine for data input surrounded by a broken line is executed and the compensation data input by the ten-key for setting a number of sheets of copying paper from the operation panel is written in the non-volatile RAM 27 of the control part shown in FIG. 5.

(3) When the print switch is turned ON from the operation panel, width of rolled paper being set, magnification ratio of lens selected and input of cutting size are checked and the reference pulses $N_s$, $N_c$ conforming to such input conditions are read from the reference value table of ROM 26, the compensating values are read from the compensating value table of non-volatile RAM 27 as these values for the reference values are previously input in the preceding function mode. Thereby, the compensated pulses $N_s$, $N_c$ having added compensating value (including the case where the compensation is not required) are set.

(4) When said pulses $N_s$, $N_c$ are set, interrupt of pulse interrupt routine shown in FIG. 9 are allowed.

(5) In the pulse interrupt routine, execution is started upon start of scanning of film picture and subtraction of pulses $N_s$ being set is carried out for each acceptance of synchronous pulse by the CPU 25 of control part shown in FIG. 4. Above subtraction is repeated and when a number of pulses $N_s$ becomes zero, namely when counting of pulse $N_s$ completes, the paper supply clutch turns ON and supply of rolled paper is started again from the temporary stop position C. Center matching is executed by such processings.

(6) From counting of the next pulse, subtraction of the pulses $N_c$ is carried out. When subtraction is repeated until the pulses $N_c$ becomes zero, the cutter solenoid turns ON and the rolled paper web is cut into the copying paper of the specified size. The copying paper is subjected to transfer of picture and fixing. After the copying operations are repeated as many times as a preset number of sheets, execution of pulse interrupt routine completes and operation returns to the step before execution of reader mode.

In this embodiment, the table of many kinds of reference number of pulses $N_s$, $N_c$ corresponding to each operation mode in accordance with magnification ratio of lens and cutter size is prepared in the ROM 26 but it is also possible to obtain the pulses $N_s$, $N_c$ of many kinds by calculation each time when required in the CPU 25.

Magnification ratio is also determined to 10.5 and 15 in addition to 14.5, 10 and 7.5 employed in the embodiment and the three kinds of magnification ratio among those are selected in accordance with the destination and since a film scanning speed also changes depending on magnification ratio of lens, three kinds of magnification ratios to be selected are determined depending on the factory specification.

A cutting size can also be selected from the four kinds of sizes by the push button operation at the operation panel and five kinds of sizes are additionally prepared in accordance with destination. Accordingly, total of nine kinds of sizes are prepared for the cutting size. Setting of such cutting size is also selected at the factory in accordance with destination.

The present invention comprises a means for projecting the image of microfilm onto a screen at the time of reading or onto a photosensitive member at the time of printing, means, at the time of printing, for scanning the aperture card across a projection axis for slit manner projection from the scanning start position same for each aperture cards irrespective of film sizes, means for supplying paper web from rolled paper, means for cutting the web supplied in a paper transporting path so as to provide a sheet paper of desired size, means for altering a magnification ratio for projecting the image of microfilm, means for selecting a paper cutting size to be cut by the web cutting means, first timer means which has a timer value in accordance with an altered magnification ratio and a selected cutting size and starts counting of the time simultaneously with the start of scanning of the microfilm, second timer means which has a timer value in accordance with a selected cutting size and starts counting of the time simultaneously with the end of counting of said first timer, and control means which controls said web supplying means and said web cutting means so that the supply of the web starts when the first timer means completes the counting of the time and the web is cut when the second timer means completes the counting of the time. Accordingly, the present invention provides following effects;

(a) Exchange of substrate which holds a film is no longer necessary for change of cutting size in accordance with a cutting size and such requirement can easily be met by program processing in the control system, a detecting mechanism is not required and a number of parts can be reduced.

(b) Regarding diversification of cutting sizes, any kinds of cutting sizes can be selected by the program processings.

(c) Adjustment for deviation in cutting length of copying paper and copied picture depending on intrinsic characteristic of machines can also be done easily only by inputting a compensating value in the program processing and such operations can be done accurately.

Although the present invention has been fully described by way of examples with reference to the accompanying drawings, it is to be noted that various changes and modifications will be apparaent to those skilled in the art. Therefore, unless otherwise such changes and mofifications depart from the scope of the present invention, they should be construed as being included therein.

What is claimed is:

1. A reader printer for handling an image of microfilm held by an aperture card and positioned in such a manner that the microfilm center aligns with the center of the card aperture, comprising;

means for projecting the image of microfilm onto a screen at the time of reading or onto a photosensitive member at the time of printing, means, at the time of printing, for scanning the aperture card across a projection axis for slit manner projection from the same scanning start position for each aperture card irrespective of film size, means for supplying paper web from rolled paper, means for cutting the web supplied in a paper transporting path so as to provide a sheet paper of desired size, means for altering a magnification ratio for projecting the image of microfilm, means for selecting a paper cutting size to be cut by the web cutting means, first timer means which has a timer value in accordance with an altered magnification ratio and a selected cutting size and starts counting of the time simultaneously with the start of scanning of the microfilm, second timer means which has a timer value in accordance with a selected cutting size and starts counting of the time simultaneously with the end of counting of said first timer, and control means which controls said web supplying means and said web cutting means so that the supply of the web starts when the first timer means completes the counting of the time and the web is cut when the second timer means completes the counting of the time.

2. A reader printer as claimed in claim 1, wherein the timer values of the first and the second timer means are variably set for compensating various errors.

3. A reader printer as claimed in claim 1, wherein the control means has a first memory which stores reference values for said first and second timer values and a second memory which stores compensating values for compensating the reference values so as to add to the reference values.

4. A reader printer as claimed in claim 3, wherein said control means further includes an input means for inputting said compensating values.

* * * * *